United States Patent [19]

Morikawa

[11] Patent Number: 4,984,540
[45] Date of Patent: Jan. 15, 1991

[54] FUEL INJECTION CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 373,934

[22] Filed: Jun. 28, 1989

[30] Foreign Application Priority Data

Jul. 21, 1988 [JP] Japan .................. 63-182718

[51] Int. Cl.$^5$ .................. F02D 41/14; F02M 23/06
[52] U.S. Cl. .................. 123/73 C; 123/533; 123/489
[58] Field of Search .............. 123/65 B, 65 BA, 73 C, 123/489, 440, 486, 531, 533, 532

[56] References Cited

U.S. PATENT DOCUMENTS

| | | | |
|---|---|---|---|
| 4,694,803 | 9/1987 | Asakura et al. | 123/489 X |
| 4,727,845 | 3/1988 | Misumi et al. | 123/489 X |
| 4,763,629 | 8/1988 | Okazaki et al. | 123/489 |
| 4,773,377 | 9/1988 | Watanabe et al. | 123/489 |
| 4,807,572 | 2/1989 | Schlunke | 123/73 C |
| 4,825,837 | 5/1989 | Nakagawa | 123/489 |
| 4,860,699 | 8/1989 | Rocklein | 123/65 BA X |

FOREIGN PATENT DOCUMENTS 113819  5/1987  Japan .

*Primary Examiner*—Willis R. Wolfe
*Attorney, Agent, or Firm*—Martin A. Farber

[57] ABSTRACT

A two-stroke engine has a scavenge pump provided in an intake passage, and a fuel injector provided for injecting fuel directly into a cylinder of the engine. A sensor is provided in an exhaust passge for detecting the concentration of a component of the exhaust gas, thereby detecting the actual air-fuel ratio. A desired air-fuel ratio of exhaust gas including a part of scavenging air supplied by the scavenge pump is derived from a map. The actual air-fuel ratio is compared with the desired air-fuel ratio to produce an error signal. In accordance with the error signal, the quantity of fuel injected by the fuel injector is controlled so as to cause the actual air-fuel ratio to converge to the desired air-fuel ratio.

5 Claims, 4 Drawing Sheets

FUEL INJECTION CONTROL SYSTEM FOR A TWO-CYCLE ENGINE

BACKGROUND OF THE INVENTION

The present invention relates to a system for controlling the injection of fuel for a two-cycle engine with a direct fuel injection system.

There are various methods for supplying fuel to the two-cycle engine. In a method where fuel is mixed with air to make a mixture and the mixture is supplied to a cylinder of the engine, a part of the fuel escapes from the cylinder through an exhaust port upon scavenging of the cylinder. In order to prevent the fuel from escaping through the exhaust port, there is a method in which air alone is delivered to the cylinder and the fuel is injected directly to the cylinder by an injector. In such an engine with the direct fuel injection system, when scavenging is performed in the cylinder, a part of scavenge air is discharged through the exhaust port together with the burned mixture. Consequently, the air-fuel ratio of the mixture in the combustion chamber is different from the air-fuel ratio estimated from a constituent of the exhaust gas. Accordingly, it is difficult to control the air-fuel ratio of the mixture based on the constituent, of the exhaust gas detected by an $O_2$-sensor provided in the exhaust system.

It is also necessary to control the air-fuel ratio for improving and stabilizing exhaust emission of the two-stroke-cycle engine. However, an open-loop control cannot control the air-fuel ratio with accuracy, and hence, it is preferable to control the air-fuel ratio with feedback control.

Japanese Patent Application Laid-Open 62-113819 discloses a two-stroke-cycle engine in which first and second scavenge passages are provided. The first scavenge passage is provided with a first throttle valve and a fuel injector. The quantity of fuel is calculated in accordance with engine speed and a signal from an air-flow meter. However, the engine is not employed with a direct fuel injection system, but fresh air is delivered from the first and second scavenge passages to perform scavenging so as to prevent the fuel from escaping through the exhaust port. Accordingly, the structure and control system of the engine are complicated. Further, since the quantity of injected fuel is calculated in accordance with engine load, the air-fuel ratio is not controlled.

SUMMARY OF THE INVENTION

The object of the present invention is to provide a fuel injection control system for a two-stroke-cycle engine in which the air-fuel ratio is controlled by feedback control, thereby improving the exhaust emission and driveability of a motor vehicle driven by the engine.

In the two-stroke-cycle engine, scavenging is performed by fresh air only. At that time, a part of the scavenging air is discharged from an exhaust port. Thus, the air-fuel ratio of the exhaust gas becomes large. In the present invention, in order to control the exhaust emission, a sensor is provided in an exhaust passage for monitoring the air-fuel ratio of the exhaust gas including the scavenging air.

These and other objects and features of this invention will become understood from the following description with reference to the accompanying drawings.

DETAILED DESCRIPTION OF THE PREFERRED EMBODIMENTS

Figure 1:
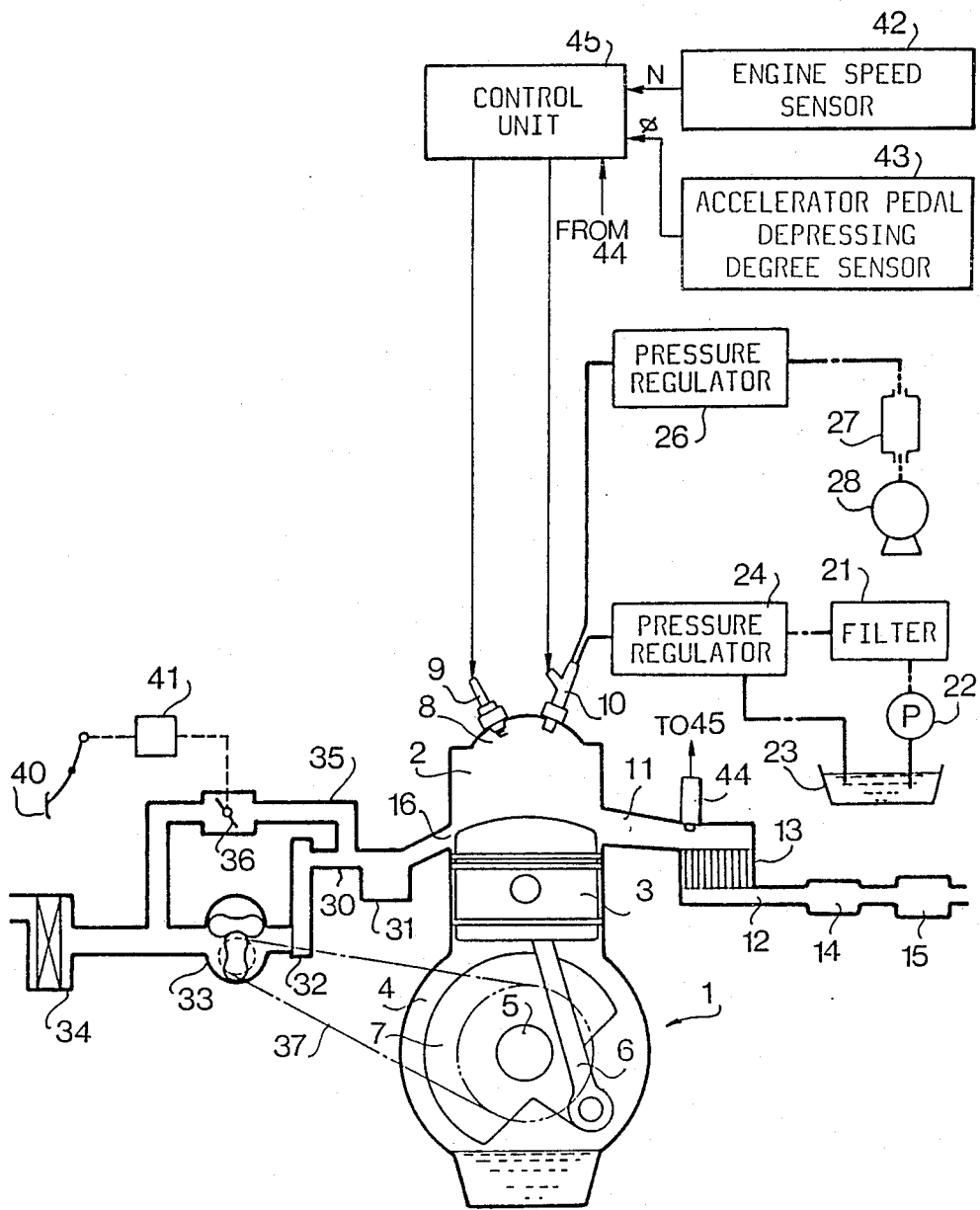
FIG. 1 is a schematic diagram of a two-stroke-cycle engine of the present invention.

Referring to FIG. 1, a two-stroke-cycle engine 1 comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed at 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The injector 10 is a type where a predetermined amount of fuel is injected together with air by compressed air in the form of an air-fuel mixture. Fuel in a fuel tank 23 is supplied to the injector 10 through a fuel passage 20 having a filter 21, a pump 22 and a pressure regulator 24 for constantly maintaining the fuel at a predetermined low fuel pressure. The fuel is mixed with the air supplied to the injector 10 through a compressor 28 passing through an air passage having an accumulator 27 and a pressure regulator 26.

The engine 1 is supplied with air through an air cleaner 34, a displacement scavenge pump 33, an intercooler 32 for cooling scavenge air, an intake pipe 30 having a scavenge chamber 31 for absorbing scavenge pressure waves when the scavenge port 16 is opened or closed. A bypass 35 is provided around the scavenge pump 33 and the intercooler 32. The bypass 35 is provided with a control valve (throttle valve) 36. Exhaust gas of the engine 1 is discharged through the exhaust port 11, an exhaust pipe 12 having a catalytic converter 13, an exhaust chamber 14 and a muffler 15.

The scavenge pump 33 is operatively connected to the crankshaft 5 through a transmitting device 37 comprising an endless belt running over a crank pulley and a pump pulley. The scavenge pump 33 is driven by the crankshaft 5 through the transmitting device 37 for producing a scavenge pressure. An accelerator pedal 40 is operatively connected with the control valve 36 through a valve controller 41. The opening degree of the control valve 36 is controlled by the controller 41 so as to be inversely proportional to the depressing degree of the accelerator pedal 40. Further, an engine speed sensor 42 and an accelerator pedal depressing degree sensor 43 are provided for determining engine operating conditions. An $O_2$-sensor 44 having a linear characteristic such as a titania $O_2$-sensor is provided in the exhaust pipe 12 for detecting the air-fuel ratio of exhaust gas in which a part of the scavenge air is induced.

Output signals from the sensors 42, 43 and 44 are supplied to a control unit 45 which feeds an ignition signal, an air injection pulse signal and a fuel injection pulse signal to the spark plug 9 and the injector 10, respectively.

Figure 2:
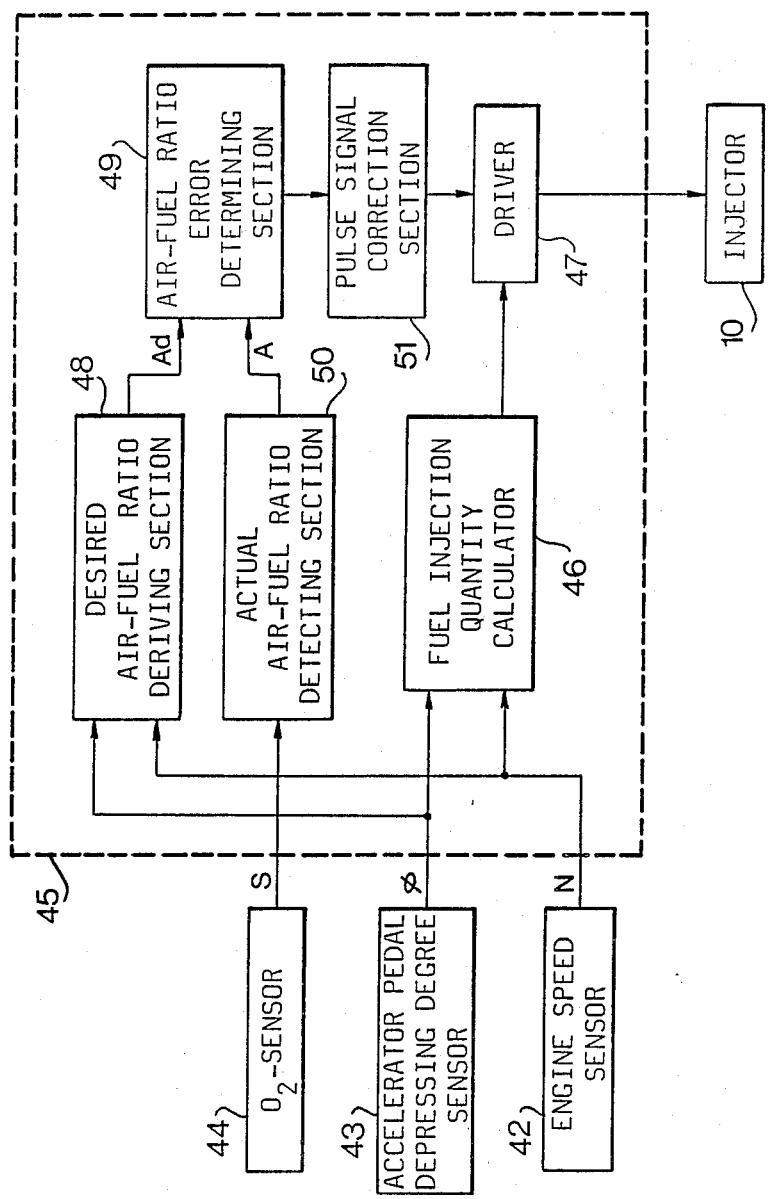
FIG. 2 is a block diagram showing a control unit according to the present invention.
Figure 3:
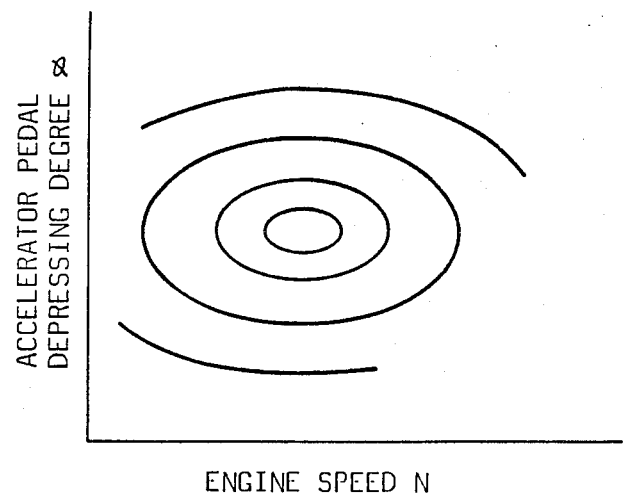
FIG. 3 is a map showing a desired air-fuel ratio of the exhaust gas.

Referring to FIG. 2, the control unit 45 comprises a fuel injection quantity calculator 46 which calculates the quantity of injected fuel in dependency on the engine operating conditions represented by engine speed N and accelerator pedal depressing degree $\phi$. A fuel injection signal corresponding to the calculated fuel quantity is applied to a driver 47 which produces a fuel injection pulse signal and an air injection pulse signal for driving the fuel injector 10. FIG. 3 shows a desired air-fuel ratio map in which a plurality of desired air-fuel ratios Ad are stored and arranged in accordance with the engine speed N and the accelerator pedal depressing degree $\phi$.

The desired air-fuel ratio is provided for the exhaust gas. Therefore it is determined in consideration of the quantity of scavenge air included in the exhaust gas.

A desired air-fuel ratio deriving section 48 is provided for deriving a desired air-fuel ratio from the map in accordance with engine speed N and accelerator pedal depressing degree $\phi$. The desired air-fuel ratio Ad is applied to an air-fuel ratio error determining section 49.

A signal S from the $O_2$-sensor 44 is applied to an actual air-fuel ratio detecting section 50 which detects the actual air-fuel ratio A of the exhaust gas including a part of the scavenge air. The actual air-fuel ratio A is also applied to the air-fuel ratio error determining section 49. At the section 49, the actual air-fuel ratio A is compared with the desired air-fuel ratio Ad for determining whether the air-fuel mixture is lean or rich and for producing an error signal. The error signal is applied to a pulse signal correction section 51. In accordance with the error signal, a correction quantity is determined and applied to the driver 47 where the fuel injection pulse signal from the calculator 46 is corrected with the correction quantity at the driver 47.

The operation of the two-stroke-cycle engine is described hereinafter.

The air supplied from the scavenge pump 33 and cooled at the intercooler 32 is returned to the inlet side of the scavenge pump 33 through the bypass 35. Since the opening degree $\phi$ of the control valve 36 is controlled to be inversely proportional to the depressing degree $\phi$ of the accelerator pedal 40, when the depressing degree $\phi$ of the accelerator pedal is small, the control valve 36 is largely opened. As a result, a large amount of air is returned to the inlet side of the scavenge pump 33. Thus, a small amount of air, which corresponds to the small accelerator pedal depressing degree, flows into the cylinder 2 for scavenging without causing pumping loss. As the depressing degree $\phi$ increases, the quantity of fresh air forced into the cylinder 2 increases with the closing of the control valve 36.

When the piston 3 reaches a position close to the bottom dead center as shown in FIG. 1, the scavenge port 16 opens as well as the exhaust port 11 so that intake air, the quantity of which depends on the position of the accelerator pedal 40, is delivered by the scavenge pump 33 into the cylinder 2 through the intercooler 32 and the scavenge port 16. Consequently, burned gas in the cylinder 2 is scavenged so that fresh intake air is admitted therein in a short time. During the compression stroke, the piston 3 rises, closing both ports 11 and 16. A dose of fuel accumulated in the injector 10 in accordance with the fuel injection pulse signal from the control unit 45 is injected by the compressed air, which is supplied in accordance with the air pulse signal, as air-fuel mixture. The mixture swirls in the combustion chamber with the scavenging air and is ignited by the spark plug 9 immediately before the top dead center. After the explosion, the piston 3 descends for the power stroke. Accordingly, the exhaust port 11 is opened so that burned gas in the cylinder 2 which is still under high pressure escapes. The piston 3 further descends, thereby returning to the afore-described intake stroke where the cylinder 2 is scavenged.

During the operation, the opening degree $\phi$ of the control valve 36 changes with the load on the engine in accordance with the depression of the accelerator pedal 40, thereby controlling the quantity of scavenging air in the cylinder 2. Further, the quantity of the fuel from the fuel injector 10 is controlled in dependency on the engine driving conditions in accordance with the engine speed N and the accelerator pedal depressing degree $\phi$. Thus, the air-fuel ratio of the mixture in the combustion chamber becomes substantially constant. The power of the engine is controlled by changing the quantity of the injected mixture having a constant air-fuel ratio in accordance with the load on the engine.

Figure 4:
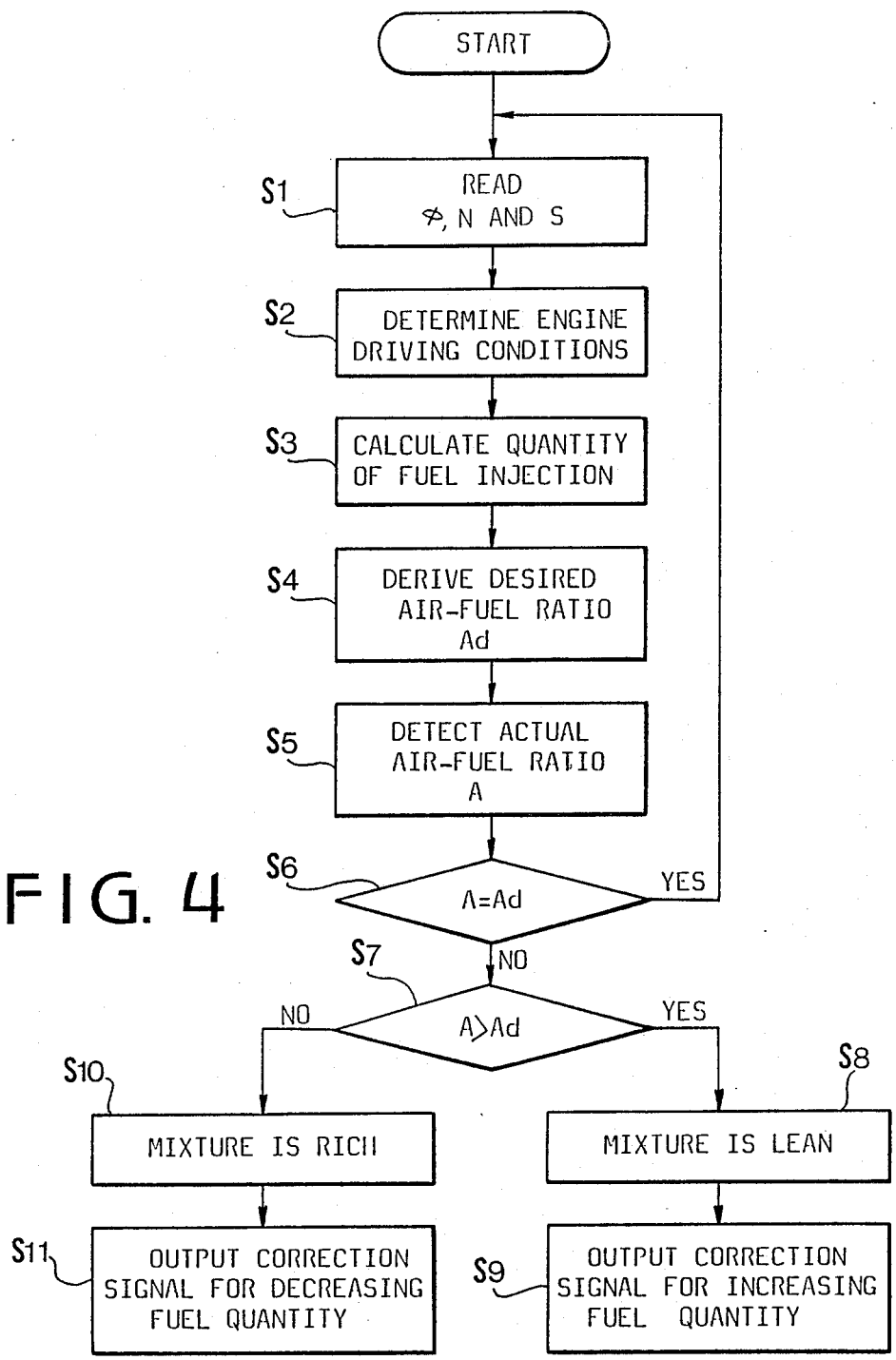
FIG. 4 is a flowchart showing an operation of the system.

Describing the operation of the system with reference to the flowchart of FIG. 4, signals $\phi$, N and S are read from the sensors 43, 42 and 44 at a step S1. At a step S2, engine driving conditions are determined in accordance with signals $\phi$ and N. At a step S3, the quantity of injected fuel is calculated in the fuel injection quantity calculator 46 based on the engine driving conditions. At a step S4, the desired air-fuel ratio Ad is derived from the desired air-fuel ratio map at section 48. At step S5, the actual air-fuel ratio A of the exhaust gas including a part of the scavenging air is detected at the actual air-fuel ratio detecting section 50 in accordance with the signal S from the $O_2$-sensor 44. The actual air-fuel ratio A and the desired air-fuel ratio Ad are compared in the air-fuel ratio error determining section 49 at a step S6. When the air-fuel ratio of the mixture burned in the cylinder is a predetermined preferable value and hence the actual air-fuel ratio A equals to the desired air-fuel ratio Ad (A = Ad), the correction operation is not performed, and the program returns to step S1. If the actual air-fuel ratio A is different from the desired air-fuel ratio Ad, the program goes to a step S7 where it is determined whether the actual air-fuel ratio A is larger than the desired air-fuel ratio Ad (A > Ad) or not. If A > Ad, it is determined at a step S8 that the air-fuel mixture is lean. At a step S9, a rich correction signal for increasing the quantity of the fuel is produced from the pulse signal correction section 51, so the quantity of the fuel for the fuel injector 10 is corrected by being increased by the driver 47. Unless A > Ad at step S7, it is determined at a step S10 that the air-fuel mixture is rich. At a step S11, a lean correction signal for decreasing the quantity of the fuel is produced. Accordingly, the air fuel ratio of the mixture is controlled by feedback control so as to maintain the desired air fuel ratio Ad.

In accordance with the present invention, the exhaust gas is monitored to determine whether the actual air-fuel ratio of the exhaust gas is larger or smaller than the desired air-fuel ratio, and the air-fuel ratio of the air-fuel mixture is controlled by the feedback control based on the comparison. Thus, the mixture in the combustion chamber is controlled to be substantially equal to the desired air-fuel ratio, thereby stabilizing combustion and improving exhaust emission and driveability of the vehicle. The system continues to control the air-fuel ratio with high accuracy for a long time by the feedback control.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an air-fuel ratio control system for a two-cycle engine having a cylinder with a scavenge port and an exhaust port, an intake passage communicating with said scavenge port, an exhaust passage communicating with said exhaust port, a fuel injector directly injecting an amount of fuel and air into said cylinder, a scavenge pump i said intake passage for supplying compressed air into said cylinder through said scavenge port as scavenge air, and a throttle valve disposed in a bypass, around said scavenge pump, of said intake passage, the improvement in the system comprising:

a feedback control for controlling the air-fuel ratio comprising:

means comprising an $O_2$-sensor having a linear characteristic provided in said exhaust passage for detecting actual air-fuel ratio in exhaust gases in which a part of the scavenge air is induced and for generating a corresponding actual air-fuel ratio signal;

an engine speed sensor for detecting engine speed and for producing a corresponding engine speed signal;

an accelerator position sensor for detecting depressing degree of an accelerator pedal operatively connected with said throttle valve and for producing a corresponding degree signal;

calculating means responsive to said engine speed and degree signals for deriving a desired air-fuel ratio stored as a function of said engine speed and said depressing degree of said accelerator pedal and for producing a corresponding desired air-fuel ratio signal;

a comparator responsive to said actual air-fuel ratio signal and said desired air-fuel ratio signal for comparing said actual and said desired air-fuel ratios and for producing a correction signal when ratios are different in order to correct the amount of fuel or air to be injected into said cylinder; and control means responsive to said correction signal for controlling the amount of fuel or air injected into said cylinder so as to immediately converge said actual air-fuel ratio to said desired air-fuel ratio, thereby stabilizing optimum combustion of the fuel in said cylinder and improving emission of said exhaust gases and controlability of said engine.

2. The system according to claim 1, wherein said $O_2$-sensor is a titania sensor.

3. The system according to claim 1, wherein said comparator compares said actual and desired air-fuel ratios for determining if the actual air-fuel ratio is rich or lean and for producing said correction signal so as to converge said actual air-fuel ratio to said desired air-fuel ratio so that the air-fuel ratio of air-fuel mixture in said combustion chamber becomes substantially constant.

4. The system according to claim 3, further comprising fuel injection quantity calculator means responsive to said engine speed and degree signals for providing a signal to said control means so as to control power of the engine by changing the quantity of the air-fuel mixture injected into the cylinder having said substantially constant air-fuel ratio.

5. The system according to claim 5, wherein said depressing degree of the accelerator pedal is inversely proportional to degree of opening of the throttle valve.

* * * * *